United States Patent [19]

Bose

[11] 4,409,593
[45] Oct. 11, 1983

[54] THRESHOLD-LESS COLLISION DETECTION AND BIT ARBITRATION IN A CFSK DATA SYSTEM

[75] Inventor: Sanjay K. Bose, Schenectady, N.Y.

[73] Assignee: General Electric Company, Schenectady, N.Y.

[21] Appl. No.: 338,707

[22] Filed: Jan. 11, 1982

[51] Int. Cl.³ .......................... H04Q 9/00; H04J 6/00
[52] U.S. Cl. .................................. 340/825.5; 178/3; 375/51; 375/91; 375/96; 370/89
[58] Field of Search ........... 340/825.5, 825.03, 825.05; 178/3; 375/51, 91, 96, 76; 370/86, 89

[56] References Cited

U.S. PATENT DOCUMENTS

| | | | |
|---|---|---|---|
| 3,924,065 | 12/1975 | Freeny, Jr. | 375/51 |
| 3,947,769 | 3/1976 | Rousos et al. | 375/76 |
| 4,209,834 | 6/1980 | Rabow | 375/96 |
| 4,290,140 | 9/1981 | Malm | 375/91 |
| 4,383,315 | 8/1983 | Torng | 340/825.05 |

Primary Examiner—Donald J. Yusko
Attorney, Agent, or Firm—Geoffrey H. Krauss; James C. Davis, Jr.; Marvin Snyder

[57] ABSTRACT

In a chirped-frequency-shift-keyed data system, in which a plurality of stations each contain a data transmitter and a data receiver constantly monitoring a common system communications medium even while the companion transmitter is transmitting digital data, the CFSK signal is received during each of a successive plurality of synchronous bit time intervals with a first amplitude. The received signal is: squared and filtered in a first channel; multiplied with a locally generated signal of a second amplitude and associated with a first binary chirp condition, and then filtered, in a second channel; and multiplied with another locally generated signal of the second amplitude and associated with the remaining binary chirp condition, and then filtered, in a third channel. The channel outputs are functions of the signal amplitudes and also of the number of system transmitters simultaneously transmitting one or the other of the binary data states. Comparison of the energy contents of the various channels determines if a collision has occurred; and if a collision is detected, further comparisons arbitrate the collision to the bit state of the larger number of transmitters then active. The collision detection and bit arbitration is carried out without reference to a threshold value.

15 Claims, 2 Drawing Figures

THRESHOLD-LESS COLLISION DETECTION AND BIT ARBITRATION IN A CFSK DATA SYSTEM

BACKGROUND OF THE INVENTION

The present invention relates to collision detection and bit arbitration in a digital data system and more particularly to a novel method and apparatus for threshold-less collision detection and bit arbitration in a chirped-frequency-shift-keyed (CFSK) data system.

Channel sensing has often been suggested as a method for improving the efficiency of digital transmission systems of the contention type, such as those using ALOHA random access protocols and the like. In such systems, transmission is started on a data channel only when that channel is sensed to be idle. For example, in a Carrier Sense Multiple Access/Collision Detection (CSMA/CD)-type protocol system, system efficiency can be even further increased by detecting actual collisions, i.e. simultaneous use of a channel by more than one data-transmitting entity, and causing the cessation of all colliding transmissions as soon as such collisions are detected. Further improvement is possible by biasing collision decisions in favor of one logic state (either the logic 1 or the logic 0 state) when collisions are detected between complimentary bit state transmissions. In such a protocol, a transmitting data source which had sent the "favored" data state continues its transmission while other colliding transmitters are caused to cease operation. Data receivers are, in turn, caused to decide that the "favored" bit was received whenever such a collision is detected. This form of protocol may be referred to as "collision detection with bit arbitration" (CDBA).

A major requirement for a synchronous CDBA protocol is the ability for a data station to detect collisions between complimentary bit transmissions in any given bit time interval. Once a collision is detected, bit arbitration follows. In such systems, collisions between transmitting data stations in the identical logic-state bits do not induce bit errors at a receiving station and is therefore not a problem. While many forms of data transmission systems may utilize such a synchronous CDBA scheme, it has hitherto not been implementable in a data transmission system in which a bit of data is modulated onto a radio-frequency carrier (typically in the frequency range between about 10 KHz. and about 1 MHz.) and wherein a synchronous chirp frequency-shift-keyed (CFSK) data modulation technique is utilized. CFSK methods and apparatus are described and claimed in co-pending application Ser. No. 301,706 assigned to the assignee of the present application and incorporated herein in its entirety by reference. It is highly desirable herein in its entirety by reference. It is highly desirable to provide a method for collision detection and bit arbitration in a multiple access data communication system using CFSK modulation for transmission of the data logic bit state. Hitherto, collision detection in RF modulation schemes has been implemented by comparing the detected output of a pair of matched filters, with one filter being utilized for detecting the logic 1 bit state and the other filter utilized for detecting the logic 0 bit state. The matched filters in the logic 1 and logic 0 signal paths may be provided with either a preset or adaptive threshold, such that a collision is detected if the output of both signal path matched filters simultaneously exceeds the threshold. While this approach has found some degree of success, it encounters difficulty if system noise is relatively high or if the data channel attenuation is subject to rapid fluctuation, causing choice of a threshold to become relatively difficult. A technique for collision detection and bit arbitration which does not require a threshold is therefore highly desirable.

BRIEF SUMMARY OF THE INVENTION

In accordance with the invention, in a chirped-frequency-shift-keyed data system, having a plurality of data stations each containing a data transmitter and a data receiver constantly monitoring a common system communication medium even while the companion transmitter is transmitting digital data, collisions, due to at least one of the transmitters transmitting a first binary state simultaneous with at least one other transmitter transmitting the remaining binary state, are detected by comparison of the output of first, second and third channels operating on the received signal. In the first channel, the amplitude of total instantaneous signal upon the medium is squared and then filtered to obtain a P signal, while in the second and third channels the output Q and R signals have magnitude responsive to the number of system transmitters simultaneously transmitting each respective one of first and second binary states. The difference between the P signal and the absolute value of the difference between the Q and R signals determines the presence or absence of a collision detection signal. If a collision is so detected, bit arbitration is applied such that continued transmission by the transmitter of a particular date station occurs only if the previous data bit transmitted was of a predetermined state, e.g. a logic 0 state. In the absence of a collision, the previously transmitted bit is compared with the logic state of another signal, provided by the comparison of the Q and R channels, such that a comparison result other than the previous transmitted bit causes transmission to cease.

In one presently preferred embodiment, in which the chirped-frequency-shift-keyed modulation is of the increasing-swept-frequency type during each bit time interval, the second and third channels utilize local oscillator signal generating means having a known amplitude, for converting the received signals to common intermediate-frequencies, whereby filtering and detection of the signals related to the number of transmitters simultaneously transmitting the associated one of the first and second binary conditions can be carried out prior to processing by the final collision detection and bit arbitration apparatus.

Accordingly, it is one object of the present invention to provide a method for threshold-less collision detection and bit arbitration in a data transmission system in which an RF carrier is chirp-frequency-modulated by binary data logic states.

It is another object of the present invention to provide apparatus for performing a threshold-less collision detection and bit arbitration procedure in a radio-frequency data transmission system using chirp-frequency-modulation.

This and other objects of the present invention will become apparent upon consideration of the following detailed description, when read in conjunction with the drawings.

DETAILED DESCRIPTION OF THE INVENTION

Figure 1:
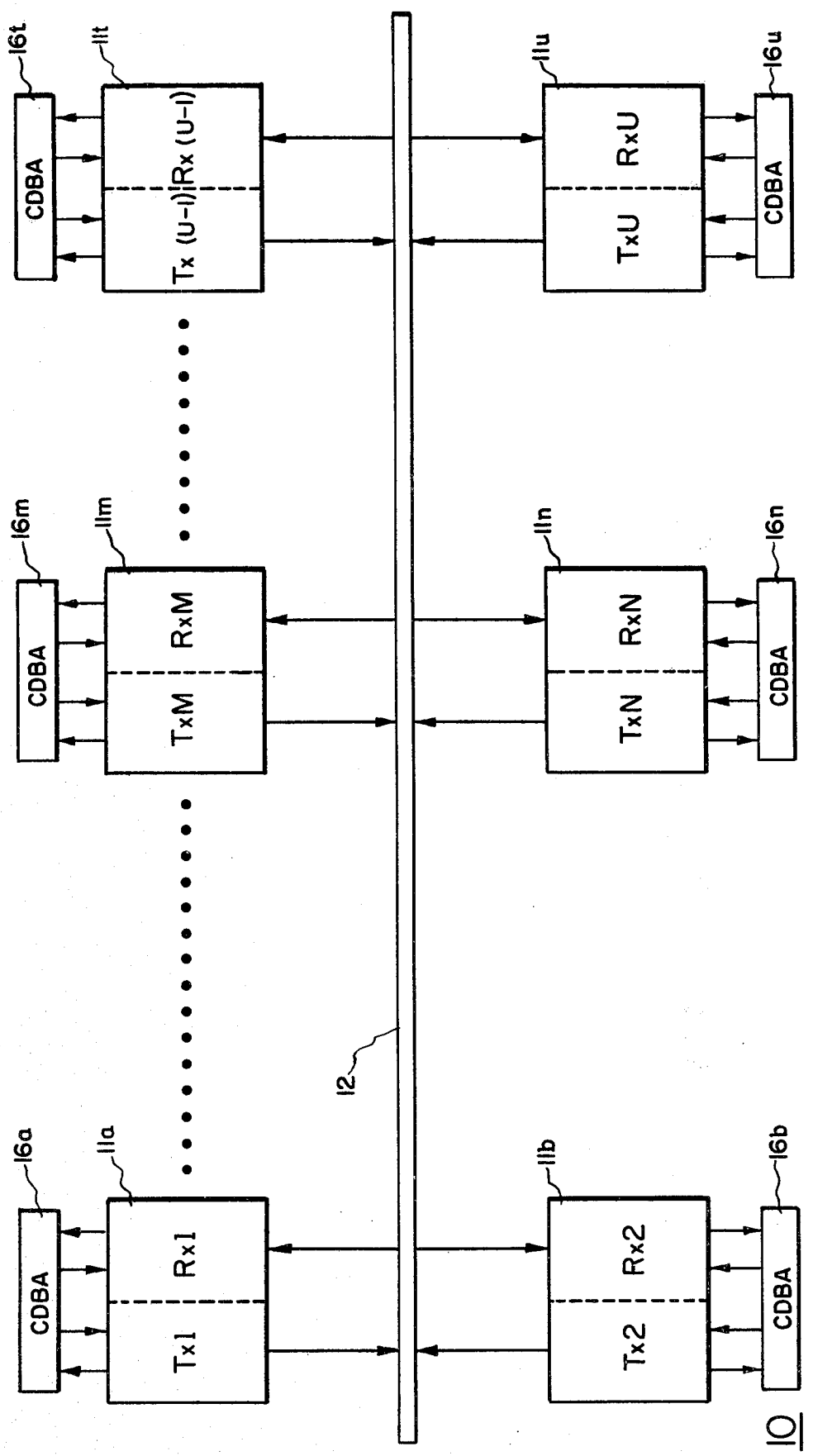
FIG. 1 is a schematic block diagram of a multiple access data communications system in which the method and apparatus of the present invention maybe used.

Referring initially to FIG. 1, a multiple access data communication system 10 has a plurality of data stations 11 commonly connected to a data transmission medium 12. Each of the U stations 11a–11u includes at least a data transmitter $T_xP$ and a companion data receiver $R_xP$, where $1 \leq p \leq \mu$. Each of data stations 11 may, at any time, attempt to transmit data by activation of its associated transmitted $T_xP$, and will at all times monitor the data flowing on media 12 with its receiver $R_xP$. Advantageously, the only connection between any one of data stations 11 and any other one of data stations 11 is via media 12. Thus, it will be seen that simultaneous transmission by a plurality of data stations 11 will result in data transmission collisions, requiring collision detection and bit arbitration to provide for an orderly flow of data within system 10.

Figure 2:
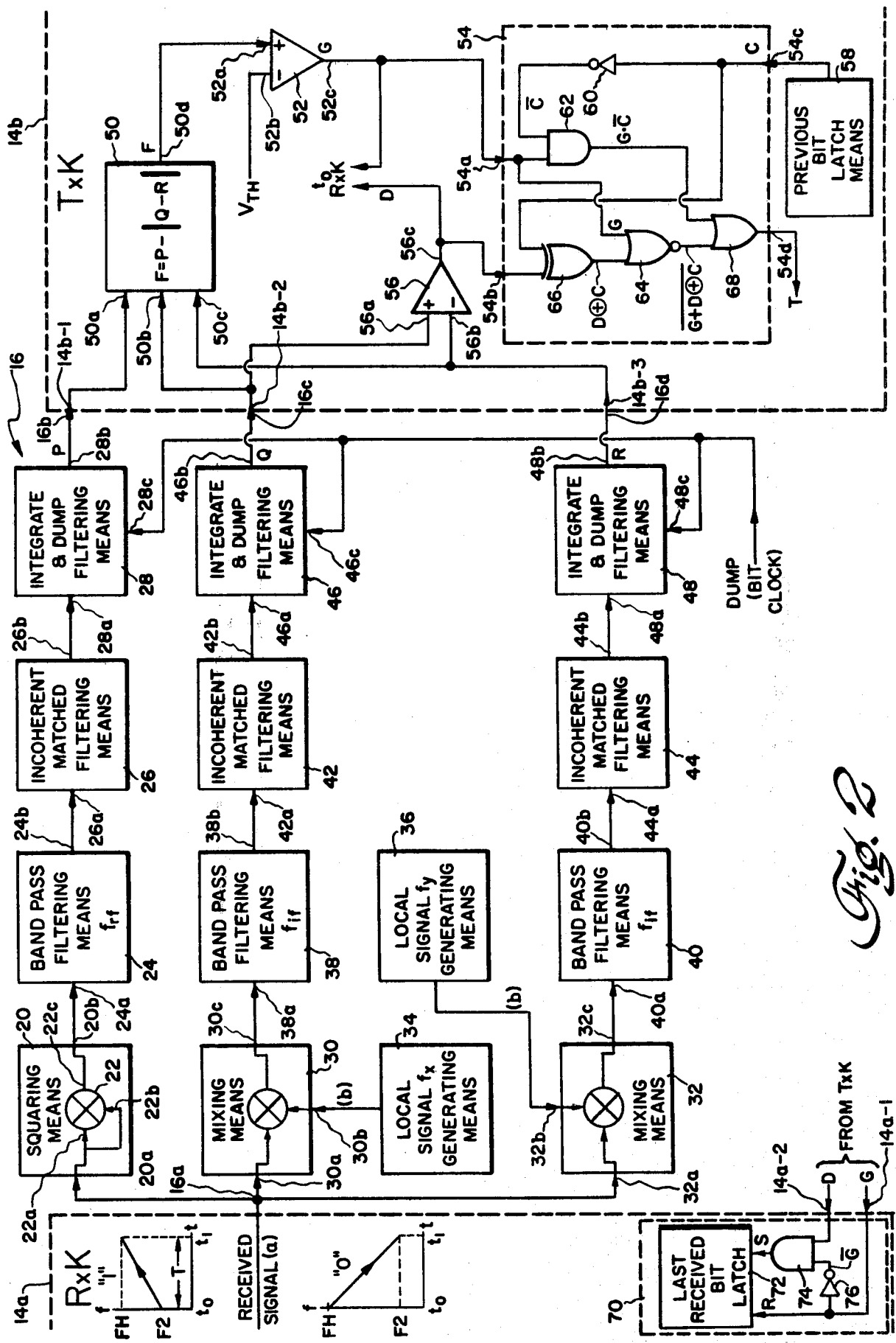
FIG. 2 is a schematic block diagram of one of the receivers and transmitters in the system of FIG. 1, and of the functional blocks required therebetween for implementing the method of the present invention.

Referring now to FIG. 2, in the presently preferred embodiment, the data stations utilize a radio frequency carrier as the information transmission means. The binary information is modulated on the carrier by linearly sweeping the carrier frequency from a first frequency to a second frequency. Thus, by way of illustration, a binary 1 is transmitted by linearly sweeping the carrier frequency f from a lower frequency $F_L$ at the start, e.g. at time $t_0$, of a bit time interval T, to a higher frequency $F_H$ at the end of the bit time interval, e.g. at time $t_1$. A binary 0 logic bit is transmitted by linearly sweeping the carrier frequency f from the higher frequency $F_H$, at the $t_0$ start time of the bit time interval T, to the lower frequency $F_L$ at the time $t_1$ at which the bit time interval T ends. For example, the lower frequency $F_L$ may be about 100 KHz. and the upper frequency $F_H$ may be about 200 KHz.

The system is advantageously of synchronous nature, such that the bit timing is essentially identical for each transmitter and receiver. Transmitters and receivers for utilizing such form of chirped-frequency-shift-keyed (CFSK) modulation are similar to those described and claimed in the aforementioned co-pending application Ser. No. 301,706, although a somewhat different form of chirp modulation, having only an increasing-frequency sweep, is described in detail therein.

The K-th data station 11k includes a receiver $R_xK$ 14a and transmitter $T_xK$ 14b. In particular, the receiver 14a includes a demodulator (not shown for reasons of simplicity) which has a matched filter means for detecting the binary 1 and binary 0 states, followed by an integrate-and-dump filter operating on each of the binary 1 and binary 0 signal paths. The received data bit, which may be originating from the companion transmitter 14b, or any other transmitter in system 10, has the logic state thereof decided, without arbitration, by a hard binary comparison of the integrator outputs, prior to dumping of the filter integrator at the end of each bit time interval.

Collision detection and bit arbitration are provided by a receiver, associated with each station transmitter (which receiver may be receiver 14a associated with transmitter 14b), monitoring media 12 while transmitter 14b is in operation and thus receiving a received signal of amplitude a. The received signal, at an input 16a of a collision detection and bit arbitration apparatus 16, is separated into three channels. In the first channel, the amplitude-a signal is applied to the input 20a of a squaring means 20. Squaring means 20 may be a mixer 22, having the received signal applied to both the signal and local oscillator inputs 22a and 22b, respectively. The mixer output 22c is connected to the squaring means output 20b and thence to the input 24a of a bandpass filtering means 24. The bandpass filter 24 is centered at a frequency $f_{rf}$ which is twice the center frequency of the communications channel utilized. In the illustrative example, wherein the carrier is chirped between 100–200 KHz., the average frequency of the carrier is 150 KHz., whereby bandpass filtering means 24 is centered at $f_{rf} = 300$ KHz. The bandpass filtered signal at filtering means output 24b is applied to the input 26a of an incoherent matched filtering means 26. While a matched filter detector may be utilized for means 26, the signal at input 26a may appear with random phase relative to a phase reference, whereby use of the incoherent matched filter is preferred. The signal at incoherent matched filtering means output 26b is applied to the signal input 28a of an integrate-and-dump filtering means 28. The input signal is thus integrated over the bit time interval of the system and appears as a signal P at the filter output 28b, prior to the filter integrator being dumped responsive to a dump (bit clock) pulse appearing at input 28c at the end of each bit time interval T.

The second and third signal processing channels are substantially identical, each having the received signal at input 16a applied to the input 30a or 32a of an associated mixing means 30 and 32, respectively. A local oscillator signal, of amplitude b, is applied to a local oscillator input 30b or 32b, respectively, from a local signal generating means 34 or 36, respectively. The output 30c or 32c of respective mixing means 30 or 32 is applied to the input 38a or 40a, respectively, of an associated one of a pair of bandpass filtering means 38 or 40, having the same center intermediate frequency $f_{if}$. The first local signal $f_x$ generating means 34 provides a locally generated signal of amplitude b having a swept linearly-increasing frequency which is greater than the logic 1 frequency sweep by the i-f frequency. Thus, first local oscillator frequency $f_x$ will be linearly swept from about 140 KHz. to 240 KHz., when the i-f frequency $f_{if}$ is about 40 KHz. Conversely, the second local signal $f_y$ generating means 36 provides a locally generated signal of amplitude b having a frequency linearly swept downwardly, and offset from the logic 0 sweep by the i-f frequency. Thus, local oscillator frequency $f_y$ is swept from a starting frequency of about 240 KHz. to about 140 KHz., in the illustrated system, with a 40 KHz. intermediate frequency.

The respective bandpass filtering means outputs 38b or 40b are connected to the respective input 42a or 44a of an incoherent matched filtering means 42 or 44. The respective incoherent matched filtering means output 42b or 44b is respectively connected to the respective input 46a or 48a of an associated integrate-and-dump filtering means 46 or 48. The integrate-and-dump filter means output 46b provides a Q signal at the end of each bit time interval, while the integrate-and-dump filter means output 48b provides a R signal at the end of each bit time interval, prior to the appearance of a dump pulse at respective inputs 46c and 48c.

In a system 10 having a multiplicity of transmitters which may be in operation at any particular time, there may be M transmitters transmitting a logic 1 signal and N transmitters transmitting a logic 0 signal in any given bit time interval. Accordingly, for each channel gains, the P, Q and R signals are given by:

$$P = KMNa^2/2,$$

$$Q = KMab/2,$$

and $$R = KNab/2,$$

where K is a positive gain constant associated with the receiver.

The P, Q and R signals at CDBA means output 16b, 16c and 16d, respectively, are supplied to the respective inputs 50a, 50b and 50c of a means 50, illustratively in transmitter 14b, for providing a signal F at an output 50d thereof which is equal to the difference between the P signal and the absolute value of the difference between the Q and R signals, i.e. $F = P - |Q - R|$. Thus, function means 50 may be implemented by utilizing polarity inverters, summing amplifiers and an absolute value detector, all of which circuits are known to the art. The signal F is applied to the non-inverting input 52a of a comparator 52, having a threshold voltage $V_{TH}$ applied to the inverting input 52b thereof. Comparator 52 determines the value of the variable signal G such that signal G is in the logic 1 state if the amplitude of signal F is greater than the threshold voltage $V_{TH}$ (which may be set to a zero magnitude by connecting input 52b to a ground potential) and is set to the logic 0 state if the F signal amplitude is less than or equal to the threshold voltage. Thus, for the case where $V_{TH} = 0$, $G = 1$ if $F > 0$ and $G = 0$ if $F \leq 0$. The G signal at comparator output 52c is applied to one input 54a of a decision-making means 54, and also to an input 14a-1 of receiver means 14a, for a purpose to be described hereinbelow.

The Q signal at transmitter section input 14b-2 is also applied to the non-inverting input 56a of another comparator means 56. The R signal at transmitter input 14b-3 is also applied to the inverting input 56b of this second comparator. A signal D at the second comparator output 56c is thus at a logic 1 level if the amplitude of the Q signal is greater than the amplitude of the R signal, but is in the logic 0 state otherwise. The signal D is applied to another receiver section input 14a-2 and to a second decision-making means input 54b.

Within transmitter 14b is a means 58 for storing the logic state of the previous bit transmitted by that transmitter. This latched-previous-bit-state C is provided to means 58 at a third input 54c of the decision-making means.

Decision-making means 54 receives the G, D and C signals at respective inputs 54a, 54b and 54c, to derive a signal T at an output 54d, which will be in the logic 1 state only if the particular transmitter 14b is to continue transmission of the next bit of data in its message. Means 54 must consider the value of signal G and assume that a collision occurred if the signal G is in the logic 1 state. If so, continued transmission should occur only if the previous bit C transmitted was a logic 0 state; otherwise transmission is to cease (the output 54d is to be a logic 0 state). Alternatively, if the signal G is a logic 0 state and a collision is not detected, the logic state of signal D is compared with the previously transmitted bit C. Only if the D and C bit states match is transmission to be continued. If the D and C bit states do not match, the transmission T signal must be in the logic 0 state, causing transmitter 14b to cease transmission. Thus, decision-making means 54 includes an inverting means 60 receiving the C signal from input 54c and supplying a C signal to one input of a two-input AND gate 62. The remaining input of gate 62 receives the G signal from input 54a. Input 54a also provides the G signal to one input of a two-input NOR gate 64. The remaining input of gate 64 is connected to the output of an exclusive-OR (XOR) gate 66, having one input receiving the D signal from input 54b and the other input receiving the C signal from input 54c. The outputs of gates 62 and 64 are each connected to a separate input of a two-input OR gate 68, having its output connected to the T signal output 54d of the decision-making means. It will be seen that $T = (G \cdot \overline{D}) + (\overline{G} \cdot \overline{(D + C)})$, and the transmit-next-bit signal T will be in the logic 1 state only if the previous bit was a logic 0, if a collision occurred, and only if previous transmitted bit is identical with the D signal if a collision did not occur.

Because of the above-described continued-transmission arbitration, receiver 14a must utilize the same considerations for determining a received bit. Thus, if a collision occurred (signal G is a logic 1), the received bit must be considered to be a logic 0. If a collision is not detected (signal G is a logic 0), then the received bit must have the same value as the D signal. Therefore, the G and D signals at receiver inputs 14a-1 and 14a-2 are utilized to set the state of a last-received-bit latch means 70 in receiver 14a. A last-received-bit latch 72 has the reset R input thereof directly connected to input 14a-1 to receive the G collision-detection signal, such that if a collision is detected and signal G is in a logic 1 state, latch 72 is immediately reset and indicates to the receiver that the last received bit was a logic 0. The set S input of latch 72 is connected to the output of a two-input AND gate 74, having a first input receiving the D signal from input 14a-2. The remaining input of gate 74 is connected to the output of an inverting means 76, having its input receiving the G signal, whereby the last received bit is set to the logic 1 state only if the G signal is a logic 0 state (indicative of no collision being detected) and in accordance with the state of the D signal.

It will be seen that the foregoing apparatus provides the desired collision detection and bit arbitration required, with a logic 0 being the favored bit in the event that a collision is detected, provided that the local signal generating means provides a local oscillator amplitude b which is not greater than the received signal amplitude a. By way of example, when the received signal and local oscillator amplitudes a and b are equal, the truth tables for collision detection signal G and for data state decision signal D are the following:

| N | 0 | 1 | 2 | 3 | 4 | 5 | 6 | 7 | 8 | 9 |
|---|---|---|---|---|---|---|---|---|---|---|
|   |   |   |   |   | G |   |   |   |   |   |
|   |   |   |   |   | M |   |   |   |   |   |
| 0 |   | 0 | 0 | 0 | 0 | 0 | 0 | 0 | 0 | 0 |
| 1 | 0 | 1 | 1 | 1 | 1 | 1 | 1 | 1 | 1 | 1 |
| 2 | 0 | 1 | 1 | 1 | 1 | 1 | 1 | 1 | 1 | 1 |
| 3 | 0 | 1 | 1 | 1 | 1 | 1 | 1 | 1 | 1 | 1 |

| | G/M | | | | | | | | | |
|---|---|---|---|---|---|---|---|---|---|---|
| N | 0 | 1 | 2 | 3 | 4 | 5 | 6 | 7 | 8 | 9 |
| 4 | 0 | 1 | 1 | 1 | 1 | 1 | 1 | 1 | 1 | 1 |
| 5 | 0 | 1 | 1 | 1 | 1 | 1 | 1 | 1 | 1 | 1 |
| 6 | 0 | 1 | 1 | 1 | 1 | 1 | 1 | 1 | 1 | 1 |
| 7 | 0 | 1 | 1 | 1 | 1 | 1 | 1 | 1 | 1 | 1 |
| 8 | 0 | 1 | 1 | 1 | 1 | 1 | 1 | 1 | 1 | 1 |
| 9 | 0 | 1 | 1 | 1 | 1 | 1 | 1 | 1 | 1 | 1 |

| | D/M | | | | | | | | | |
|---|---|---|---|---|---|---|---|---|---|---|
| N | 0 | 1 | 2 | 3 | 4 | 5 | 6 | 7 | 8 | 9 |
| 0 |   | 1 | 1 | 1 | 1 | 1 | 1 | 1 | 1 | 1 |
| 1 | 0 | $0_x$ | 1 | 1 | 1 | 1 | 1 | 1 | 1 | 1 |
| 2 | 0 | 0 | $0_x$ | 1 | 1 | 1 | 1 | 1 | 1 | 1 |
| 3 | 0 | 0 | 0 | $0_x$ | 1 | 1 | 1 | 1 | 1 | 1 |
| 4 | 0 | 0 | 0 | 0 | $0_x$ | 1 | 1 | 1 | 1 | 1 |
| 5 | 0 | 0 | 0 | 0 | 0 | $0_x$ | 1 | 1 | 1 | 1 |
| 6 | 0 | 0 | 0 | 0 | 0 | 0 | $0_x$ | 1 | 1 | 1 |
| 7 | 0 | 0 | 0 | 0 | 0 | 0 | 0 | $0_x$ | 1 | 1 |
| 8 | 0 | 0 | 0 | 0 | 0 | 0 | 0 | 0 | $0_x$ | 1 |
| 9 | 0 | 0 | 0 | 0 | 0 | 0 | 0 | 0 | 0 | $0_x$ |

The truth table for collision-detection signal G illustrates that a collision is not detected (signal G has a logic 0 state) if any number of transmitters N are transmitting a logic 0 signal, with no transmitter transmitting a logic 1 signal, or if any number M of transmitters are transmitting a logic 1 signal, with no transmitter transmitting a logic 0 signal, and that a collision is detected (G has the logic 1 state), if one or more transmitters are transmitting a logic 0 signal while one or more transmitters are simultaneously transmitting a logic 1 signal; this is the basic definition for occurrence of a collision.

Similarly, referring to the signal D truth table, it will be seen that in the non-collision condition (row N=0 or column M=0), there is no decision essentially to be made, as only one logic state appears on the system media 12. Similarly, if the number of stations transmitting one of the logic states is greater than the number of stations transmitting the remaining logic state, the decision is biased in favor of the larger number of transmitters transmitting a particular state. It is only along the diagonal of the table, with an equal number of transmitters sending logic 0 and logic 1 signals, that a doubtful decision region occurs. Normally, the decision made along this diagonal would depend almost entirely on noise and other random effects. However, by biasing the process to favor the logic 0 state, all of the decisions along this diagonal are favored to the logic 0 condition, as indicated by the use of $O_x$ state indicators.

It should also be understood that other forms of CFSK can be used with the present collision detection and bit arbitration technique. For example, the increasing-frequency chirp with offset-starting-frequency scheme of the aforementioned co-pending application Ser. No. 301,706 may be equally as well utilized, provided that the local signal generating means 34 and 36 are modified therefore. For example, both local signal generating means 34 and 36 would produce a signal linearly increasing at identical rates, but starting at different initial frequencies. Illustratively, if a logic 0 is transmitted by sweeping from 90 KHz. (a nominal 100 KHz. frequency minus a logic 0 offset frequency of 10 KHz.) to a maximum frequency of 190 KHz., and a logic 1 is transmitted by sweeping from an initial frequency of 110 KHz. (with the 10 KHz. frequency offset above the nominal start frequency) to a final frequency of 210 KHz., and with 40 KHz. intermediate frequency, the local signal $f_x$ generating means 34, responding to the logic 1 sweep, would have to linearly increase frequency, during a bit time interval from 70 KHz. to 170 KHz. (assuming that the local oscillator is below the received signal frequency), and the local signal $f_y$ generating means 36 frequency would be swept from an initial frequency of 50 KHz. to a final frequency of 150 KHz. All other means of apparatus 16 would remain the same.

While one presently preferred embodiment of my novel apparatus and method for threshold-less collision detection and bit arbitration in a CFSK data system has been described in detail herein, many modifications and variations will now become apparent to those skilled in the art. It is my intent, therefore, to be limited only by the scope of the appending claims and not by the details and instrumentalities described by way of example herein.

What is claimed is:

1. A method for collision detection in a chirped-frequency-shift-keyed (CFSK) data system having a common system communications medium and a plurality of data stations each containing a data transmitter and a data receiver, comprising the steps of:
    identifying each of a successive plurality of synchronous bit time intervals during which at least one of the plurality of data stations transmitters may transmit a bit of digital data over the common system communications medium;
    constantly monitoring the common system communications medium with each data station receiver even while the transmitter of the same data station is transmitting digital data;
    subjecting the signal received by each data station receiver to a plurality of processing operations each in a respective one of a like plurality of channels; and
    comparing the energy contents of the outputs of the plurality of channels to detect if a data transmission colision has occurred.

2. The method of claim 1, further comprising the step of further comparing the energy contents of the channels, if a collision has been detected to occur, to arbitrate the collision to the bit state of the larger number of the transmitters then transmitting a data bit signal over the common system communications medium.

3. The method of claim 2, wherein the data is binary data, said plurality of operations and channels includes first, second and third operations respectively in respective ones of first, second and third channels; and further comprising the steps of: operating in the first channel upon all simultaneously received signals corresponding to either binary data state; operating in the second channel only upon those simultaneously received signals corresponding to a first one of the binary data states; and operating in the third channel only upon those simultaneously received signals corresponding to the second one of the binary data states.

4. The method of claim 3, wherein the received signal has a first amplitude and wherein said first operation comprises the step of multiplying the received signal by itself to provide a first processed signal at the first channel output; said second operation comprises the steps of: providing a first locally-generated signal of a second amplitude; and multiplying the received signal by the first locally-generated signal to provide a second processed signal at the second channel output; and said third operation comprises the steps of: providing a second locally-generated signal of the second amplitude; and multiplying the received signal by the second locally-generated signal to provide a third processed signal at the third channel output.

5. The method of claim 4, wherein each transmitter outputs a frequency chirp with frequency varying in opposite frequency directions for first and second binary states.

6. The method of claim 5, wherein first and second locally-generated signals are frequency-chirped signals.

7. The method of claim 6, wherein the first and second locally-generated signals are frequency chirped in opposite frequency directions.

8. The method of claim 7, further comprising the step of filtering at least one of the first, second and third processed signals to provide the output of the associated channel.

9. The method of claim 8, wherein the first processed signal is filtered and including the step of filtering at a frequency which is twice the mean frequency of the CFSK chirp.

10. The method of claim 9, wherein the first and second locally-generated signals are offset by a common intermediate frequency from the respective binary CFSK frequency-chirped signals, and the second and third processed signals are filtered, and further comprising the step of filtering both the second and third processed signals at the common intermediate frequency.

11. The method of claim 4 or 10, further comprising the step of generating a signal F equal to the difference between the first channel output and the absolute value of the difference between the outputs of the second and third channels.

12. The method of claim 11, further comprising the step of providing a collision detection signal G if the signal F is greater than a predetermined vaue.

13. The method of claim 12, further comprising the steps of: providing a signal D if the output of the second channel is greater than the output of the third channel; providing the data state of the last data bit previously transmitted by that transmitter associated with the respective receiver providing the signal to the channels; and allowing the associated transmitter to transmit a next bit only if (a) the collision detection signal G is not present and the data state of the previous transmitted data bit is the same as the logic state of the signal D, and (b) if the collision detection signal G is present, only if the previous data bit was of a designated state.

14. The method of claim 13, further comprising the step of: assigning the received signal, at the output of the respective receiver, the same data state as the signal D if the collision detection signal G is not present; and assigning, at the output of the respective receiver, the received signal the designated data state if the collision detection signal G is present.

15. The method of claim 4, wherein said second amplitude is not greater than said first amplitude.

* * * * *